US009931890B2

(12) United States Patent
Abe et al.

(10) Patent No.: US 9,931,890 B2
(45) Date of Patent: Apr. 3, 2018

(54) NON-PNEUMATIC TIRE

(71) Applicant: BRIDGESTONE CORPORATION, Tokyo (JP)

(72) Inventors: Akihiko Abe, Tokyo (JP); Masashi Nishida, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 259 days.

(21) Appl. No.: 14/439,257

(22) PCT Filed: Nov. 5, 2013

(86) PCT No.: PCT/JP2013/079845
§ 371 (c)(1),
(2) Date: Apr. 29, 2015

(87) PCT Pub. No.: WO2014/069653
PCT Pub. Date: May 8, 2014

(65) Prior Publication Data
US 2015/0273946 A1 Oct. 1, 2015

(30) Foreign Application Priority Data
Nov. 5, 2012 (JP) ................................ 2012-243826

(51) Int. Cl.
*B60C 7/10* (2006.01)
*B60C 7/18* (2006.01)
(Continued)

(52) U.S. Cl.
CPC .................. *B60C 7/10* (2013.01); *B60B 9/04* (2013.01); *B60B 9/26* (2013.01); *B60C 7/18* (2013.01);
(Continued)

(58) Field of Classification Search
CPC .. B60C 7/10; B60C 7/102; B60C 7/14; B60C 7/16; B60C 7/18; B60C 7/20; B60C 7/24; B60C 7/143; B60B 9/04; B60B 9/26
See application file for complete search history.

(56) References Cited

U.S. PATENT DOCUMENTS 396,872 A    1/1889  Hicks
1,118,487 A * 11/1914 Hayman ................... B60B 9/26
                                                     152/84
(Continued)

FOREIGN PATENT DOCUMENTS

CN    1400115 A      3/2003
EP    2 910 387 A1   8/2015
(Continued)

OTHER PUBLICATIONS

International Standard, ISO 18064, "Thermoplastic elastomers—Nomenclature and abbreviated terms", First Edition, Sep. 1, 2003, 11 pgs.
(Continued)

*Primary Examiner* — Kip T Kotter
(74) *Attorney, Agent, or Firm* — Sughrue Mion, PLLC

(57) ABSTRACT

A non-pneumatic tire includes an attachment body (11) attached to an axle, an outer rim body (13) configured to surround the attachment body (11) from the outside in a tire radial direction, and a connecting member (15) configured to displaceably connect the attachment body (11) and the outer rim body (13), wherein the connecting member (15) includes elastic connecting plates (21, 22) each having both end sections (21a, 21b, 22a, 22b) connected to the attachment body (11) and the outer rim body (13), a plurality of curved end sections (21g, 21h, 22g, 22h) curved in a tire circumferential direction are formed at the inner end sections (21b, 22b) of the elastic connecting plates (21, 22) connected to the attachment body (11) in a direction in
(Continued)

which the elastic connecting plates (21, 22) extend in a side view of the tire when the tire is seen from a tire width direction, and in the curved end sections (21g, 21h, 22g, 22h), the curve directions of the curved end sections (21g, 21h, 22g, 22h) adjacent to each other are opposite to each other.

6 Claims, 4 Drawing Sheets

(51) Int. Cl.
  *B60B 9/04* (2006.01)
  *B60B 9/26* (2006.01)
  *B60C 7/24* (2006.01)
  *B60C 7/14* (2006.01)

(52) U.S. Cl.
  CPC .......... *B60C 7/24* (2013.01); *B60C 2007/107* (2013.01); *B60C 2007/146* (2013.01); *Y10T 152/1045* (2015.01); *Y10T 152/10432* (2015.01)

(56) References Cited

U.S. PATENT DOCUMENTS

| | | | |
|---|---|---|---|
| 1,160,981 A | 11/1915 | August | |
| 1,452,782 A | 4/1923 | Beisel | |
| 1,543,728 A | 6/1925 | Schulz | |
| 8,883,283 B2 * | 11/2014 | Delfino | B29D 24/002 152/43 |
| 8,962,120 B2 * | 2/2015 | Delfino | B60B 9/02 152/43 |
| 2004/0012246 A1 * | 1/2004 | Rhyne | B60B 1/0223 301/55 |
| 2004/0069385 A1 * | 4/2004 | Timoney | B60C 7/18 152/69 |
| 2009/0211675 A1 * | 8/2009 | Louden | B60B 9/02 152/55 |
| 2009/0294000 A1 * | 12/2009 | Cron | B60C 7/18 152/5 |
| 2010/0218869 A1 * | 9/2010 | Abe | B60B 9/26 152/246 |
| 2011/0108173 A1 * | 5/2011 | Abe | B60C 7/18 152/76 |
| 2011/0132510 A1 * | 6/2011 | Carrasco | B60C 7/16 152/311 |
| 2014/0251518 A1 | 9/2014 | Abe et al. | |
| 2015/0283851 A1 | 10/2015 | Abe et al. | |

FOREIGN PATENT DOCUMENTS

| | | | | |
|---|---|---|---|---|
| FR | 365022 A | | 9/1906 | |
| FR | 367459 A | * | 10/1906 | ............... B60C 7/14 |
| GB | 117698 A | | 8/1918 | |
| JP | 2008-539113 A | | 11/2008 | |
| JP | 2009286208 A | * | 12/2009 | |
| JP | 2010036884 A | * | 2/2010 | ............... B60C 7/18 |
| JP | 2011-156905 A | | 8/2011 | |
| WO | 99/64256 A1 | | 12/1999 | |
| WO | 2006/112574 A1 | | 10/2006 | |
| WO | 2006/116807 A1 | | 11/2006 | |
| WO | 2010/012091 A1 | | 2/2010 | |
| WO | 2012/017202 A1 | | 2/2012 | |
| WO | 2014/065263 A1 | | 5/2014 | |
| WO | 2014/069570 A1 | | 5/2014 | |

OTHER PUBLICATIONS

International Search Report for PCT/JP2013/079845 dated Jan. 21, 2014.

* cited by examiner

NON-PNEUMATIC TIRE

TECHNICAL FIELD

The present invention relates to a non-pneumatic tire in which filling with pressurized air is unnecessary upon use.

Priority is claimed on Japanese Patent Application No. 2012-243826, filed Nov. 5, 2012, the content of which is incorporated herein by reference.

BACKGROUND ART

In a pneumatic tire of the related art that is filled with pressurized air and used, an occurring blowout is a structurally unavoidable problem. In order to solve this problem, in recent years, for example, as disclosed in the following Patent Document 1, a non-pneumatic tire including an attachment body attached to an axle, an outer rim body configured to surround the attachment body from the outside in a tire radial direction, and a connecting member configured to displaceably connect the attachment body and the outer rim body has been proposed. The connecting member includes an elastic connecting plate having both end sections connected to the attachment body and the outer rim body.

DOCUMENT OF RELATED ART

Patent Document

[Patent Document 1] Japanese Unexamined Patent Application, First Publication No. 2011-156905

SUMMARY OF INVENTION

Technical Problem

However, in the non-pneumatic tire of the related art, the strength of the connecting member should be improved more.

In consideration of the above-described circumstances, the present invention is directed to provide a non-pneumatic tire capable of improving the strength of the connecting member.

Solution to Problem

According to a first aspect of the present invention, since a curved end section is formed at an inner end section of an elastic connecting plate, when an external force is applied to a non-pneumatic tire and an attachment body and an outer rim body are displaced relative to each other, the plurality of curved end sections are elastically deformed at the inner end sections of the elastic connecting plates according to the displacement. Accordingly, stress concentrated and applied to the inner end section of the elastic connecting plate can be distributed at this time, and generation of portions in the elastic connecting plates to which a large load is locally applied can be limited. Accordingly, the strength of the connecting member can be improved, and an impulsive force can be easily absorbed to provide good riding comfort.

According to a second aspect of the present invention, in the first aspect, since both of the elastic connecting plates extend to be spaced apart from an imaginary line in the tire circumferential direction from the outer end section toward the inner end section, when an external force is applied to the non-pneumatic tire and the attachment body and the outer rim body are displaced relative to each other, the elastic connecting plate can be appropriately elastically deformed as a whole. Accordingly, the external force applied to the non-pneumatic tire can be effectively distributed in each of the elastic connecting plates.

Effects of the Invention

According to the non-pneumatic tire of the present invention, the strength of the connecting member can be improved.

DESCRIPTION OF EMBODIMENTS

Figure 1:
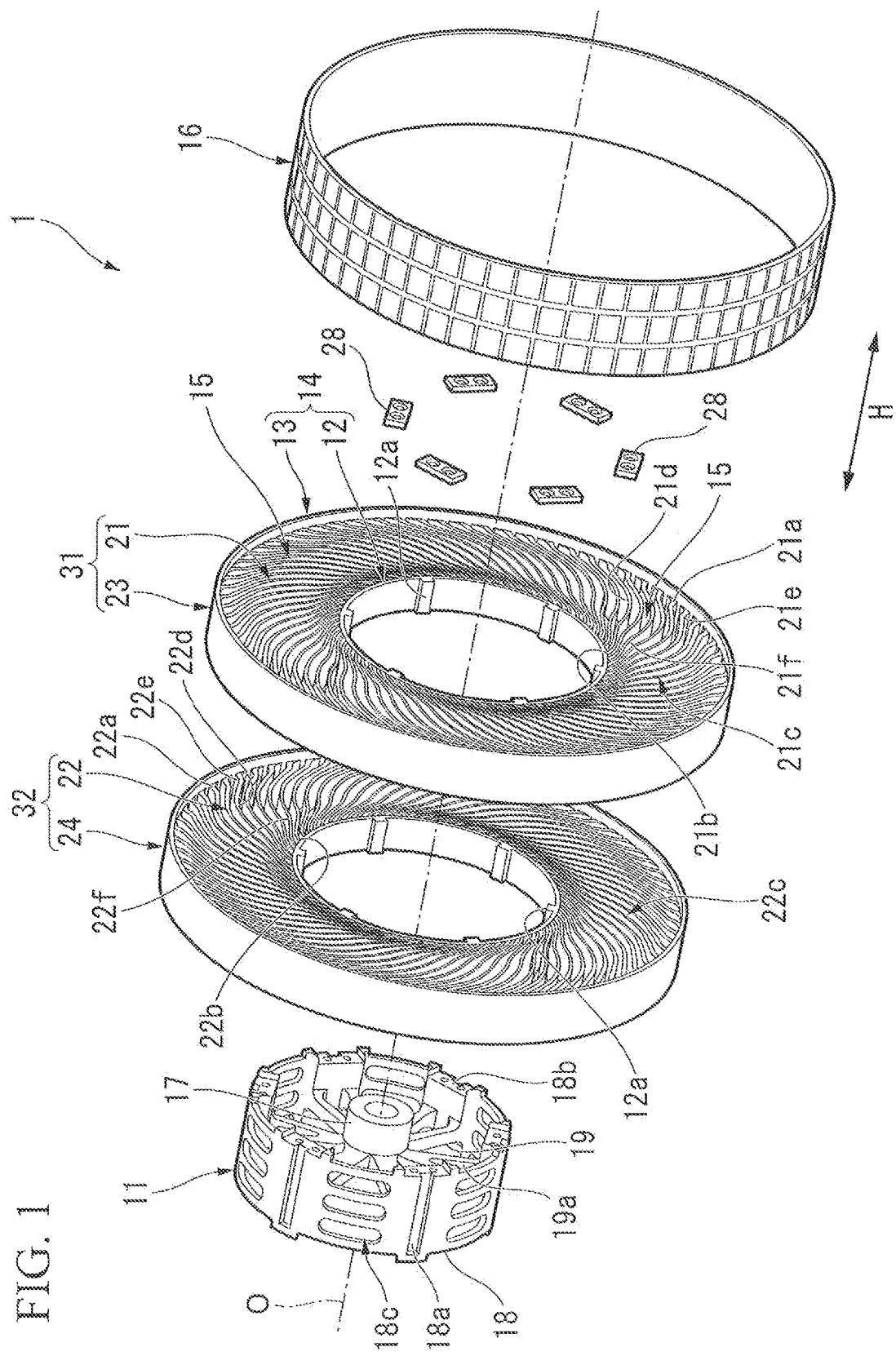
FIG. 1 is a partially exploded schematic perspective view of a non-pneumatic tire according to an embodiment of the present invention.

Hereinafter, an embodiment of a non-pneumatic tire according to the present invention will be described with reference to FIGS. 1 to 5.

A non-pneumatic tire 1 includes an attachment body 11 attached to an axle (not shown), a ring member 14 including an inner rim body 12 fitted onto the attachment body 11 and an outer rim body 13 configured to surround the inner rim body 12 from the outside in a tire radial direction, a plurality of connecting members 15 disposed between the inner rim body 12 and the outer rim body 13 in a tire circumferential direction and configured to connect both of the rim bodies 12 and 13 in a relatively elastically displaceable manner, and a tread member 16 disposed at an outer circumferential surface of the outer rim body 13 throughout the entire circumference.

Here, the attachment body 11, the inner rim body 12, the outer rim body 13 and the tread member 16 are disposed coaxially on a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner rim body 12, the outer rim body 13 and the tread member 16 are disposed such that central sections in the tire width direction H coincide with each other.

In the ring member 14, the outer rim body 13 has a larger size in the tire width direction H, i.e., a larger width, than the inner rim body 12. In addition, a plurality of ridge sections 12a protruding inward in the tire radial direction and extending throughout the entire length in the tire width direction H are disposed at an inner circumferential surface of the inner rim body 12 at intervals in the tire circumferential direction.

Figure 2:
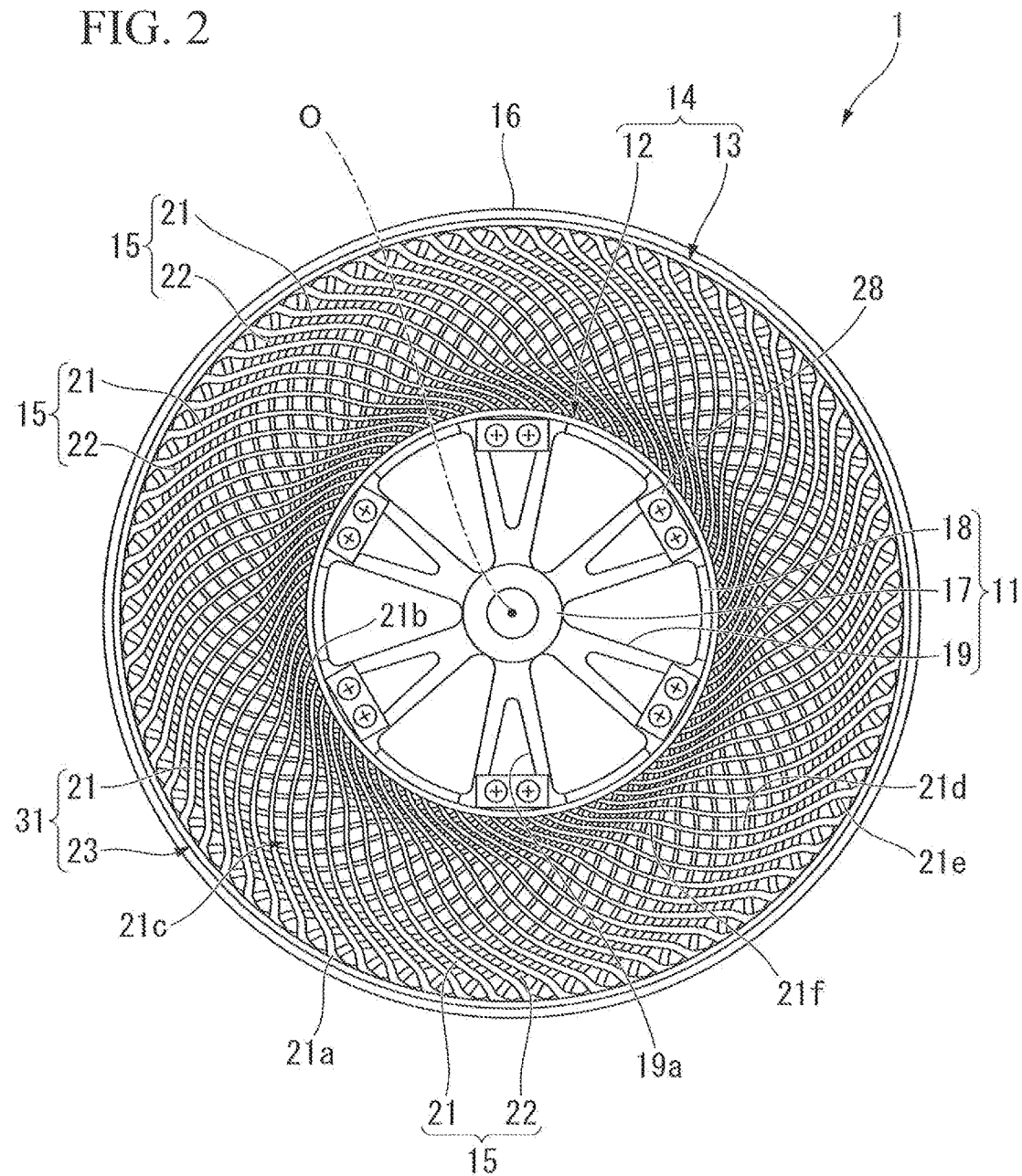
FIG. 2 is a side view of the non-pneumatic tire shown in FIG. 1 when seen from first side in a tire width direction.

As shown in FIGS. 1 and 2, the attachment body 11 includes a mounting rim section 17 on which a front end section of the axle is mounted, an outer ring section 18 configured to surround the mounting rim section 17 from the outside in the tire radial direction, and a plurality of ribs 19 configured to connect the mounting rim section 17 and the outer ring section 18.

The mounting rim section 17, the outer ring section 18 and the ribs 19 are integrally formed of a metal material such as an aluminum alloy or the like. The mounting rim section 17 and the outer ring section 18 are formed in a cylindrical shape and disposed on the same axis as the axis O. The plurality of ribs 19 are disposed point-symmetrically with respect to the axis O.

A plurality of key groove sections 18a concaved inward in the tire radial direction and extending in the tire width direction H are formed at an outer circumferential surface of the outer ring section 18 at intervals in the tire circumferential direction. In the outer circumferential surface of the outer ring section 18, the key groove sections 18a are open at only a first side of both ends in the tire width direction H and closed at a second side. The ridge sections 12a of the inner rim body 12 in the ring member 14 are fitted into the key groove sections 18a.

Further, in wall surfaces configured to define the key groove sections 18a, a pair of side wall surfaces opposite to each other in the tire circumferential direction are perpendicular to a bottom wall surface. In addition, in outer surfaces of the ridge sections 12a, a pair of side wall surfaces projecting upward from the inner circumferential surface of the inner rim body 12 are perpendicular to a top wall surface directed inward in the tire radial direction. Sizes of the ridge section in the tire circumferential direction 12a and the key groove section 18a are equal to each other.

Here, in an edge of a first side in the tire width direction H of the outer ring section 18, concave sections 18b concaved toward a second side in the tire width direction H and into which plate members 28 are fitted are formed at positions corresponding to the key groove sections 18a. Through-holes are formed in the plate members 28, and in the wall surfaces that define the concave sections 18b, female screw sections in communication with the through-holes of the plate members 28 fitted into the concave sections 18b are formed in the wall surface facing the first side in the tire width direction H. Further, the plurality of female screw sections and the plurality of through-holes are formed at intervals in the tire circumferential direction.

Then, the ring member 14 is fixed to the attachment body 11 by bolts threaded into the female screw sections through the through-holes of the plate members 28 fitted into the concave sections 18b in a state in which the inner rim body 12 is fitted onto the attachment body 11 from the outside and the ridge sections 12a are fitted into the key groove sections 18a. In this state, the ridge sections 12a are interposed between the plate members 28 and the second end wall surfaces of the wall surfaces defining the concave sections 18b disposed at the second end in the tire width direction H and facing the first side in the tire width direction H.

Further, a plurality of hole arrays 18c, in each of which a plurality of weight-reducing holes passing in the tire radial direction are disposed at intervals in the tire width direction H, are formed in a portion of the outer ring section 18 disposed between the key groove sections 18a neighboring in the tire circumferential direction at intervals in the tire circumferential direction. In addition, weight-reducing holes 19a passing in the tire width direction H are also formed in the ribs 19.

The tread member 16 is formed in a cylindrical shape, and integrally covers the outer circumferential surface side of the outer rim body 13 of the ring member 14 throughout the entire region. The tread member 16 is formed of, for example, natural rubber or/and vulcanized rubber in which a rubber composition is vulcanized, a thermoplastic material, or the like. For example, a thermoplastic elastomer, a thermoplastic resin, or the like is provided as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), or another thermoplastic elastomer (TPZ) or the like, defined by Japanese Industrial Standard JIS K6418, is provided as the thermoplastic elastomer. For example, a urethane resin, an olefin resin, a polyvinyl chloride resin, a polyamide resin, or the like, is provided as the thermoplastic resin. Further, in view of an abrasion resistance property, the tread member 16 may be formed of vulcanized rubber.

The connecting member 15 connects the attachment body 11 and the outer rim body 13 in a relatively elastically displaceable manner.

The connecting member 15 is connected to the attachment body 11 via the inner rim body 12. The connecting member 15 includes a plurality of first elastic connecting plates 21 and a plurality of second elastic connecting plates 22 configured to connect the inner rim body 12 and the outer rim body 13 of the ring member 14.

The plurality of (in the example shown, 60) connecting members 15 are installed in the tire circumferential direction such that the plurality of first elastic connecting plates 21 are disposed in the tire circumferential direction at predetermined positions in the tire width direction H, and the plurality of second elastic connecting plates 22 are disposed in the tire circumferential direction at other positions in the tire width direction H different from the predetermined positions in the tire width direction H.

That is, the plurality of first elastic connecting plate 21 are disposed in the tire circumferential direction at the same positions as in the tire width direction H, and the plurality of second elastic connecting plates 22 are disposed in the tire circumferential direction at predetermined positions in the same tire width direction H spaced apart from the first elastic connecting plates 21 in the tire width direction H. The first elastic connecting plate 21 and the second elastic connecting plate 22 are disposed at predetermined different positions in the tire width direction H, the first elastic connecting plate 21 is disposed at a first side in the above-described tire width direction H, and the second elastic connecting plate 22 is disposed at a second side in the tire width direction H.

Further, the plurality of connecting members 15 are disposed at positions point-symmetrical with respect to the axis O between the inner rim body 12 and the outer rim body 13 of the ring member 14. In addition, all of the connecting members 15 have the same shape and the same size. Further, the width of the connecting member 15 is smaller than the width of the outer rim body 13.

Then, the first elastic connecting plates 21 neighboring in the tire circumferential direction do not come in contact with each other, and the second elastic connecting plates 22 neighboring in the tire circumferential direction do not come in contact with each other either. Further, the first elastic connecting plates 21 and the second elastic connecting plates 22 neighboring in the tire width direction H do not come in contact with each other either.

Further, the first elastic connecting plates 21 and the second elastic connecting plates 22 have the same widths. In addition, the first elastic connecting plates 21 and the second elastic connecting plates 22 also have the same thicknesses.

Here, a first end section (an outer end section) 21a of the first elastic connecting plate 21 connected to the outer rim body 13 is disposed closer to a first side in the tire circumferential direction than a second end section (an inner end section) 21b connected to the inner rim body 12, and a first end section 22a of the second elastic connecting plate 22 connected to the outer rim body 13 is disposed closer to a second side in the tire circumferential direction than a second end section 22b connected to the inner rim body 12.

In addition, the first end sections 21a and 22a of the first elastic connecting plates 21 and the second elastic connecting plates 22 of the connecting members 15 are disposed at different positions in the tire width direction H and connected at the same positions in the tire circumferential direction in the inner circumferential surface of the outer rim body 13.

Figure 4:
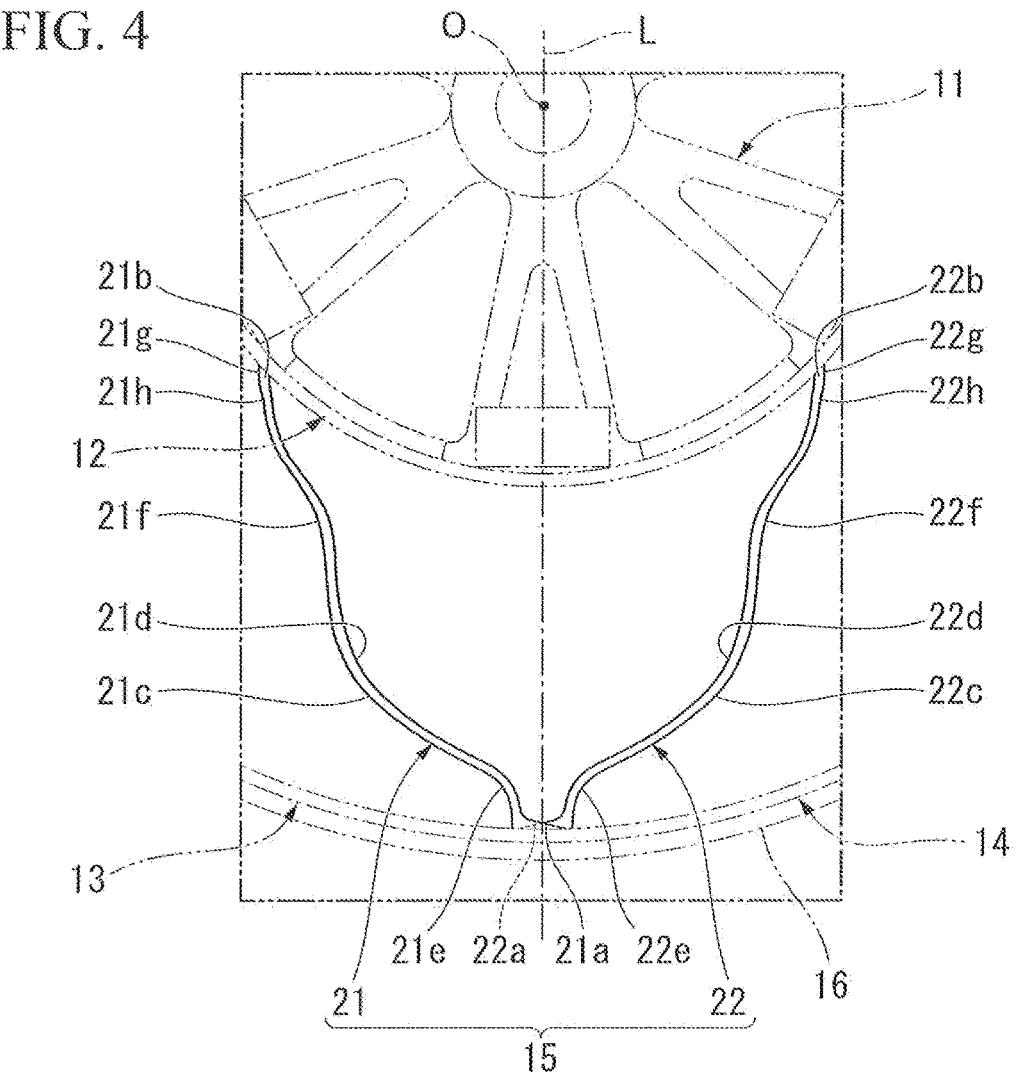
FIG. 4 is an enlarged view showing a connecting member shown in FIG. 1.

Accordingly, as shown in FIG. 4, in both of the elastic connecting plates 21 and 22, the second end sections 21b and 22b are disposed to sandwich an imaginary line L extending in the tire radial direction and passing through the first end sections 21a and 22a therebetween in the tire circumferential direction in the side view of the tire when the tire 1 is seen from the tire width direction H.

In the example shown, in the first elastic connecting plate 21 and the second elastic connecting plate 22, a plurality of intermediate curved sections 21d to 21f and 22d to 22f curved in the tire circumferential direction are formed at intermediate portions 21c and 22c disposed between the first end sections 21a and 22a and the second end sections 21b and 22b in a direction in which the elastic connecting plates 21 and 22 extend in the side view of the tire when the tire 1 is seen from the tire width direction H. In the plurality of intermediate curved sections 21d to 21f and 22d to 22f of both of the connecting plates 21 and 22, curve directions of the intermediate curved sections 21d to 21f and 22d to 22f adjacent in the above-described extending direction are opposite to each other.

The plurality of intermediate curved sections 21d to 21f formed at the first elastic connecting plates 21 have the first intermediate curved section 21d curved to protrude toward the second side in the tire circumferential direction, the second intermediate curved section 21e disposed between the first intermediate curved section 21d and the first end section 21a and curved to protrude toward a first side in the tire circumferential direction, and the third intermediate curved section 21f disposed between the first intermediate curved section 21d and the second end section 21b and curved to protrude toward the first side in the tire circumferential direction.

The plurality of intermediate curved sections 22d to 22f formed at the second elastic connecting plates 22 have the first intermediate curved section 22d curved to protrude toward the first side in the tire circumferential direction, the second intermediate curved section 22e disposed between the first intermediate curved section 22d and the first end section 22a and curved to protrude toward the second side in the tire circumferential direction, and the third intermediate curved section 22f disposed between the first intermediate curved section 22d and the second end section 22b and curved to protrude toward the second side in the tire circumferential direction.

In the example shown, for both the elastic connecting plates 21 and 22, the first intermediate curved sections 21d and 22d have a larger radius of curvature in the side view of the tire than the second intermediate curved sections 21e and 22e and the third intermediate curved sections 21f and 22f. The first intermediate curved sections 21d and 22d are disposed at central sections in a direction in which the first elastic connecting plate 21 and the second elastic connecting plate 22 extend. In addition, the second intermediate curved sections 21e and 22e have a smaller radius of curvature in the side view of the tire than the third intermediate curved sections 21f and 22f.

Then, in the embodiment, a plurality of curved end sections 21g, 21h, 22g and 22h curved in the tire circumferential direction are formed at the second end sections 21b and 22b of both of the elastic connecting plates 21 and 22 in the above-described extending direction in the side view of the tire. In the plurality of curved end sections 21g, 21h, 22g and 22h of both of the connecting plates 21 and 22, curve directions of the curved end sections 21g, 21h, 22g and 22h adjacent in the above-described extending direction are opposite to each other.

Figure 5:
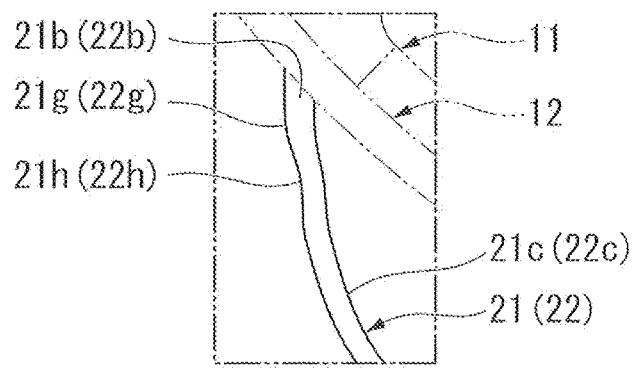
FIG. 5 is an enlarged view of the second end section of the elastic connecting plate shown in FIG. 1.

As shown in FIGS. 4 and 5, the plurality of curved end sections 21g and 21h formed at the first elastic connecting plates 21 have the first curved end section 21g curved to protrude toward the second side in the tire circumferential direction, and the second curved end section 21h curved to protrude toward the first side in the tire circumferential direction. The first curved end section 21g is disposed inside in the tire radial direction and connected to the attachment body 11 via the inner rim body 12, and the second curved end section 21h is disposed outside in the tire radial direction and connected to the intermediate portion 21c of the first elastic connecting plate 21.

As shown in FIG. 4, the plurality of curved end sections 22g and 22h formed in the second elastic connecting plates 22 have the second curved end section 22g curved to protrude toward the first side in the tire circumferential direction, and the second curved end section 22h curved to protrude toward the second side in the tire circumferential direction. The second curved end section 22g is disposed inside in the tire radial direction and connected to the attachment body 11 via the inner rim body 12, and the second curved end section 22h is disposed outside in the tire radial direction and connected to the intermediate portion 22c of the second elastic connecting plate 22.

In the example shown, for both the elastic connecting plates 21 and 22, the first curved end sections 21g and 22g and the second curved end sections 21h and 22h have the same radius of curvature in the side view of the tire. In addition, the curved end sections 21g, 22g, 21h and 22h have a smaller radius of curvature in the side view of the tire than the intermediate curved sections 21d to 21f and 22d to 22f.

Further, lengths of both of the elastic connecting plates 21 and 22 are equal to each other, and as shown in FIG. 4, the second end sections 21b and 22b of both of the elastic connecting plates 21 and 22 are connected to positions spaced the same angle (for example, 20° or more to 135° or less) from positions in the outer circumferential surface of the inner rim body 12 opposite to the first end sections 21a and 22a in the tire radial direction at first side and the second side in the tire circumferential direction about the axis O when seen in the side view of the tire. In addition, the first intermediate curved sections 21d and 22d, the second intermediate curved sections 21e and 22e and the third intermediate curved sections 21f and 22f of the first elastic connecting plate 21 and the second elastic connecting plate 22 protrude in opposite directions in the tire circumferential direction and have the same size. Further, the first curved end sections 21g and 22g and the second curved end sections 21h and 22h of the first elastic connecting plate 21 and the second elastic connecting plate 22 also protrude in opposite directions in the tire circumferential direction and are the same size.

Accordingly, as shown in FIG. 4, a shape in the side view of the tire of each of the connecting members 15 is line-symmetrical with respect to the imaginary line L. In addition, in the example shown, both of the elastic connecting plates 21 and 22 extend to be gradually spaced apart from the imaginary line L in the tire circumferential direction from the first end sections 21a and 22a toward the second end sections 21b and 22b.

Further, in both of the elastic connecting plates 21 and 22, a thickness of first end side portion from the central section to the first end sections 21a and 22a in the above-described extending direction may be larger than a thickness of the second end side portion from the central section to the second end sections 21b and 22b. Accordingly, the strength of the first end side portions to which a large load in the first and second elastic connecting plates 21 and 22 is easily applied can be increased while suppressing an increase in the weight of the connecting members 15 and securing flexibility of the connecting members 15. Further, here, the first end side portions smoothly continue to the second end side portions with no step difference.

Also, in the embodiment, the ring member 14 and the plurality of connecting members 15 are integrally formed.

Further, in the embodiment, as shown in FIG. 1, the ring member 14 is split into one split ring member 23 disposed at a first side in the tire width direction H, and the other split ring member 24 disposed at a second side in the tire width direction H. Further, in the example shown, the ring member 14 is split at the central section in the tire width direction H.

Then, the one split ring member 23 is integrally formed with the first elastic connecting plate 21, and the other split ring member 24 is integrally formed with the second elastic connecting plate 22.

Further, in the embodiment, the one split ring member 23 and the first elastic connecting plate 21, and the other split ring member 24 and the second elastic connecting plate 22 are integrally formed through casting or injection molding.

Hereinafter, a member obtained by integrally forming the one split ring member 23 and the first elastic connecting plate 21 is referred to as a first split case body 31, and a member obtained by integrally forming the other split ring member 24 and the second elastic connecting plate 22 is referred to as a second split case body 32.

Here, the injection molding may be a general method of simultaneously forming both of the entire first and second split case bodies 31 and 32, and in the first and second split case bodies 31 and 32, one of the one and the other split ring members 23 and 24 and the first and second elastic connecting plates 21 and 22 may be an insert product, and the other may be an insert molding product formed through injection molding, or so-called two color formation, or the like.

In addition, in the first and second split case bodies 31 and 32, the one and the other split ring members 23 and 24 and the first and second elastic connecting plates 21 and 22 may be formed of different materials, or may be formed of the same material. Further, while the material may be a metal material, a resin material, or the like, a resin material, in particular, a thermoplastic resin, may be preferable in view of a decrease in weight.

Further, when both of the entire first and second split case bodies 31 and 32 are simultaneously injection-molded, the plurality of ridge sections 12a formed at the inner rim body 12 may be a gate portion.

In the first and second split case bodies 31 and 32, a central section in the tire width direction H of the first and second elastic connecting plates 21 and 22, a central section in the tire width direction H of the outer rim body 13, and a central section in the tire width direction H of the inner rim body 12 coincide with each other, and the inner rim body 12 has a smaller width than the outer rim body 13, and has the same width as the first elastic connecting plates 21 and the second elastic connecting plates 22.

Then, edges in the tire width direction H of the outer rim body 13 of the one split ring member 23 and the outer rim body 13 of the other split ring member 24 are connected by, for example, welding, fusion, adhesion, or the like. Further, among these, in the case of the welding, for example, hot plate welding or the like may be employed.

In addition, edges in the tire width direction H of the inner rim body 12 of the one split ring member 23 and the inner rim body 12 of the other split ring member 24 are separated from each other in the tire width direction H. Accordingly, generation of burrs on the inner circumferential surface of the inner rim body 12 fitted onto the attachment body 11 from the outside is prevented.

Figure 3:
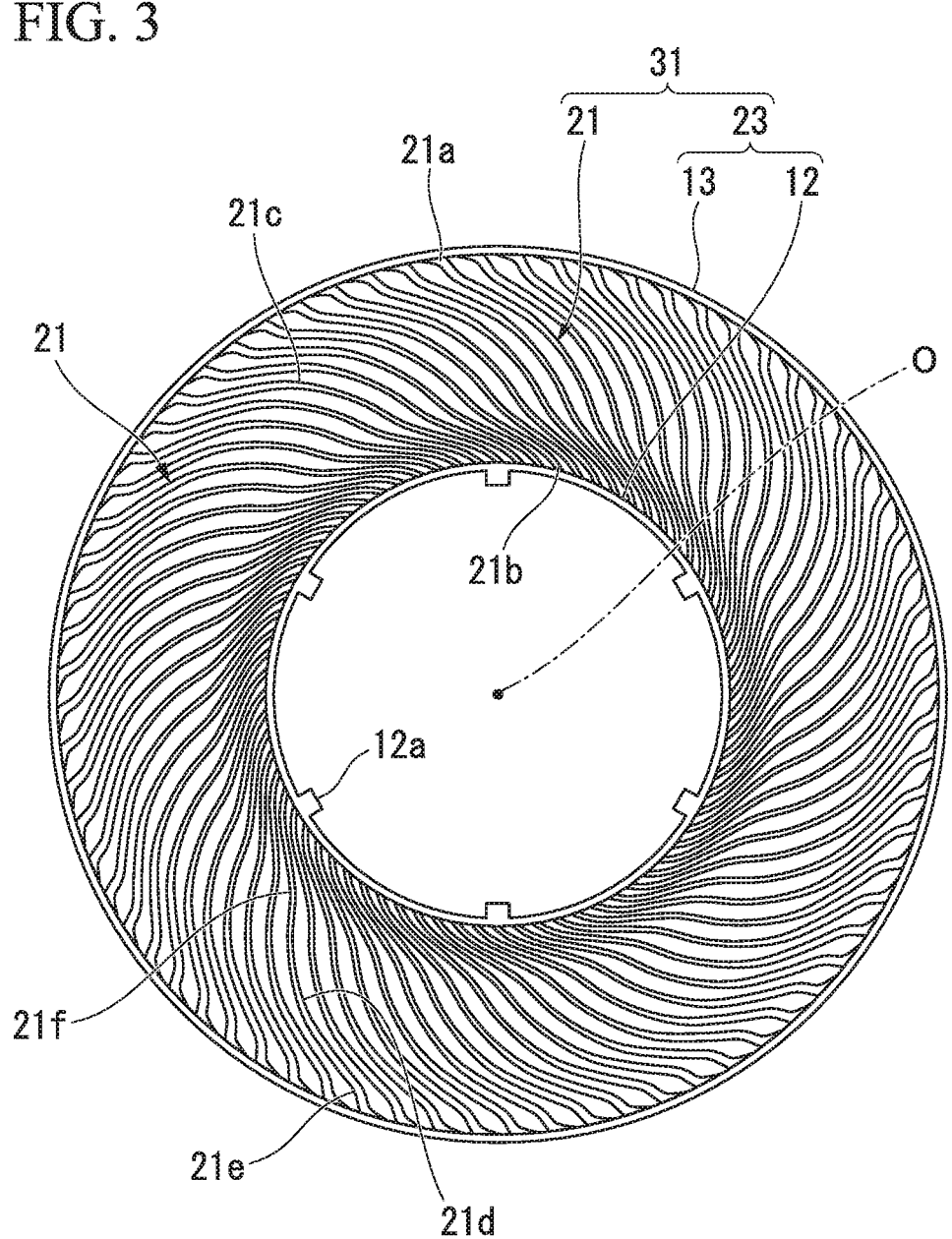
FIG. 3 is a plan view of a first split case body of the non-pneumatic tire shown in FIG. 1, in which a split ring member of first side and a first elastic connecting plate are integrally formed, when seen from first side in the tire width direction, or a plan view of a second split case body in which a split ring member of the second side and a second elastic connecting plate are integrally formed, when seen from the second side in the tire width direction.

In addition, the first split case body 31 and the second split case body 32 have the same shape and the same size as shown in FIG. 3 in a state before the bodies 31 and 32 are connected as described above.

Then, when connected as described above, the non-pneumatic tire 1 is obtained as the edges in the tire width direction H of the outer rim bodies 13 of the first split case body 31 and the second split case body 32 match to be connected to each other in a state in which directions in the tire width direction H of both of the split case bodies 31 and 32 are opposite to each other while matching the positions in the tire circumferential direction of the first split case body 31 and the second split case body 32, such that the connecting members 15 are line-symmetrical to each other as described above when seen in the side view of the tire.

As described above, according to the non-pneumatic tire 1 of the embodiment, since the curved end sections 21g, 21h, 22g and 22h are formed at the second end sections 21b and 22b of the elastic connecting plates 21 and 22, when an external force is applied to the non-pneumatic tire 1 and the attachment body 11 and the outer rim body 13 are displaced relative to each other, the plurality of curved end sections 21g, 21h, 22g and 22h are elastically deformed at the second end sections 21b and 22b of the elastic connecting plates 21 and 22 according to the displacement. Accordingly, here, stress concentrated and applied to the second end sections 21b and 22b of the elastic connecting plates 21 and 22 can be easily distributed, and generation of portions in the elastic connecting plates 21 and 22 to which a large load is locally applied can be limited. Accordingly, the strength of the connecting member 15 can be improved, and an impulsive force can be easily absorbed to provide good riding comfort.

In addition, since both of the elastic connecting plates 21 and 22 extend to be gradually spaced apart from the imaginary line L in the tire circumferential direction from the first end sections 21a and 22a toward the second end sections 21b and 22b, when an external force is applied to the non-pneumatic tire 1 and the attachment body 11 and the outer rim body 13 are displaced relative to each other, the elastic connecting plates 21 and 22 can be appropriately elastically deformed as a whole.

Accordingly, the external force applied to the non-pneumatic tire 1 can be effectively distributed in the elastic connecting plates 21 and 22.

In addition, since the non-pneumatic tire 1 includes the first split case body 31 in which the one split ring member 23 and the first elastic connecting plates 21 are integrally formed, and the second split case body 32 in which the other split ring member 24 and the second elastic connecting plates 22 are integrally formed, when the non-pneumatic tire 1 is assembled, even if not all of the end sections 21*a*, 22*a*, 21*b* and 22*b* of the plurality of connecting members 15 are connected to the inner rim body 12 and the outer rim body 13, since it is sufficient that the first and second split case bodies 31 and 32 are mounted on the attachment body 11, manufacturing time can be reduced.

In addition, since the first and second split case bodies 31 and 32 are provided, for example, an increase in weight can be limited in comparison with a case in which all of the end sections 21*a*, 22*a*, 21*b* and 22*b* of the connecting member 15 are connected to the inner rim body 12 and the outer rim body 13 using a fastening member or the like.

Further, since the plurality of first elastic connecting plates 21 are disposed in the tire circumferential direction at positions in the tire width direction H and the plurality of second elastic connecting plates 22 are disposed in the tire circumferential direction at other positions in the tire width direction H, interference between the connecting members 15 neighboring in the tire circumferential direction can be limited, and a restriction on the number disposed can be limited.

In addition, since the first end section 21*a* of the first elastic connecting plate 21 connected to the outer rim body 13 is disposed closer to a first side in the tire circumferential direction than a second end section 21*b* connected to the inner rim body 12 and the first end section 22*a* of the second elastic connecting plate 22 connected to the outer rim body 13 is disposed closer to the second side in the tire circumferential direction than the second end section 22*b* connected to the inner rim body 12, when an external force is applied to the non-pneumatic tire 1, the first elastic connecting plate 21 and the second elastic connecting plate 22 can be easily elastically deformed, and flexibility can be provided to the non-pneumatic tire 1 to secure good riding comfort.

Further, in the first split case body 31 and the second split case body 32, since either the plurality of first elastic connecting plates 21 or the plurality of second elastic connecting plates 22 which extend in a certain direction are disposed in plural between the outer rim body 13 and the inner rim body 12 when seen in the side view of the tire, and the others which extend in another direction are not disposed therebetween, when the ring member 14 and the connecting members 15 are formed, first, by forming the first and second split case bodies 31 and 32 having structures that can be simply and easily formed, in comparison with the case in which the case body having a complex structure is obtained by integrally forming all of the ring member 14 and the connecting members 15, the non-pneumatic tire 1 can be easily and reliably formed.

In addition, since the first and second split case bodies 31 and 32 are integrally formed through casting or injection molding, the non-pneumatic tire 1 can be more easily formed.

Moreover, as described above, in the split case bodies 31 and 32, since only one of both of the elastic connecting plates 21 and 22 is disposed between the outer rim body 13 and the inner rim body 12, when the split case bodies 31 and 32 are integrally formed through casting or injection molding, a molten metal or a molten resin can easily and reliably reach corners in the mold, the structure of the mold can be limited from becoming complicated, and the non-pneumatic tire 1 can be more easily and reliably formed.

In addition, since the connecting members 15 are line-symmetrically formed with respect to the imaginary line L when seen in the side view of the tire, occurrence of a difference between a spring constant along a first side in the tire circumferential direction of the non-pneumatic tire 1 and a spring constant along the second side can be limited, and good controllability can be provided.

Further, the technical spirit of the present invention is not limited to the embodiment but various modifications may be made without departing from the spirit of the present invention.

For example, curve directions of the intermediate curved sections 21*d* to 21*f* in the first elastic connecting plate 21 and curve directions of the intermediate curved sections 22*d* to 22*f* in the second elastic connecting plate 22 are not limited to the embodiment and may be appropriately varied.

In addition, in the embodiment, while a configuration in which one of the first elastic connecting plates 21 and the second elastic connecting plates 22 are provided as the connecting members 15 is shown, instead of this, a configuration in which both of the plurality of first elastic connecting plates 21 and the plurality of second elastic connecting plates 22 are provided as one of the connecting members 15 at different positions in the tire width direction H may be employed.

In addition, the plurality of connecting members 15 may be disposed in the tire width direction H between the inner rim body 12 and the outer rim body 13.

In addition, unlike the embodiment, for example, the second end sections 21*b* and 22*b* of the first elastic connecting plates 21 and the second elastic connecting plates 22 may be connected at opposite positions of the outer circumferential surface of the inner rim body 12 with the axis O interposed therebetween in the tire radial direction, or in the outer circumferential surface of the inner rim body 12, may be connected to the first end sections 21*a* and 22*a* of the first elastic connecting plate 21 and the second elastic connecting plate 22 at opposite positions or the like in the tire radial direction.

In addition, unlike the embodiment, the first end sections 21*a* and 22*a* of both of the connecting plates 21 and 22 may be connected to the inner circumferential surface of the outer rim body 13 at different positions in the tire circumferential direction.

Further, a gap in the tire width direction H may not be provided between the inner rim body 12 of the one split ring member 23 and the inner rim body 12 of the other split ring member 24.

In addition, the ring member 14 may be divided into three portions or more in the tire width direction H, or may not be divided.

Further, the first and second split case bodies 31 and 32 are not limited to the embodiment but may be formed through cutting or the like.

In addition, the curve directions of the curved end sections 21*g* and 21*h* in the first elastic connecting plate 21 and the curve directions of the curved end sections 22*g* and 22*h* in the second elastic connecting plate 22 are not limited to the embodiment and may be appropriately varied.

Further, in the embodiment, both of the elastic connecting plates 21 and 22 extend to be gradually spaced apart from the imaginary line L in the tire circumferential direction from the first end sections 21a and 22a toward the second end sections 21b and 22b, but the embodiment is not limited thereto.

In addition, the ring member 14 and the plurality of connecting members 15 may not be integrally formed with each other.

Furthermore, the ring member 14 and the connecting members 15 are not limited to those shown in the embodiment. For example, the outer rim body and the attachment body may be connected via the connecting member in a relatively elastically displaceable manner without the inner rim body.

Moreover, the components of the above-described embodiment may be appropriately substituted with known components or the above-described variants may be appropriately combined without departing from the spirit of the present invention.

INDUSTRIAL APPLICABILITY

Strength of the connecting member of the non-pneumatic tire is improved.

DESCRIPTION OF REFERENCE SIGNS 1 non-pneumatic tire
11 attachment body
13 outer rim body
15 connecting member
21, 22 elastic connecting plate
21a, 22a first end section (outer end section)
21b, 22b second end section (inner end section)
21g, 21h, 22g, 22h curved end section
L imaginary line

The invention claimed is:
1. A non-pneumatic tire comprising:
an attachment body attachable to an axle;
a ring member including an inner rim body fitted onto the attachment body and an outer rim body configured to surround the inner rim body from the outside in a tire radial direction; and
a connecting member configured to displaceably connect the inner rim body and the outer rim body,
wherein the connecting member comprises an elastic connecting plate having a first end section connected to the inner rim body and a second end section connected to the outer rim body,
the ring member and the connecting member are integrally formed of a resin material,
the elastic connecting plate comprises a plurality of curved end sections curved in a tire circumferential direction formed at the first end section of the elastic connecting plate connected to the inner rim body in a direction in which the elastic connecting plate extends in a side view of the tire when the tire is seen from a tire width direction,
in these curved end sections, the directions in which the curved end sections adjacent to each other curve are directed to oppose each other, and
an outermost curved end section of the curved end sections disposed closest to the outer rim body has a radius of curvature that is smaller than a radius of curvature of another of the curved end sections disposed radially inward of the outermost curved end section.

2. The non-pneumatic tire according to claim 1, wherein the elastic connecting plate comprises a first elastic connecting plate and a second elastic connecting plate disposed at different positions in the tire width direction,
the second end sections of both of the elastic connecting plates connected to the outer rim body are connected to the same position in the tire circumferential direction,
the first end sections of both of the elastic connecting plates are disposed to sandwich an imaginary line extending in the tire radial direction and passing through the second end sections therebetween in the tire circumferential direction in the side view of the tire when the tire is seen from the tire width direction, and
both of the elastic connecting plates extend to be gradually spaced apart from the imaginary line in the tire circumferential direction from the second end section to the first end section.

3. The non-pneumatic tire according to claim 1, wherein the radius of curvature of the outermost curved section is smaller than a radius of curvature of a curved section disposed in a center portion of the elastic connecting plate.

4. The non-pneumatic tire according to claim 3, wherein an inner curved end section of the curved end sections disposed closer to the inner rim body than the curved section disposed in the center portion has a radius of curvature smaller than a radius of curvature of the curved section disposed in the center portion of the elastic connecting plate.

5. The non-pneumatic tire according to claim 4, wherein the radius of curvature of the inner curved section is greater than the radius of curvature of the outermost curved section.

6. The non-pneumatic tire according to claim 1, wherein the radius of curvature of the outermost curved section is smaller than a radius of curvature of all other of the curved end sections.

* * * * *